United States Patent [19]
Donovan

[11] Patent Number: 6,005,580
[45] Date of Patent: Dec. 21, 1999

[54] METHOD AND APPARATUS FOR PERFORMING POST-PROCESS ANTIALIASING OF POLYGON EDGES

[75] Inventor: Walter E. Donovan, Milpitas, Calif.

[73] Assignee: Micron Technology, Inc., Bosie, Id.

[21] Appl. No.: 08/648,283

[22] Filed: May 15, 1996

Related U.S. Application Data

[60] Provisional application No. 60/002,626, Aug. 22, 1995, provisional application No. 60/002,625, Aug. 22, 1995, and provisional application No. 60/002,620, Aug. 22, 1995.

[51] Int. Cl.$^6$ .................................................. G06T 17/00
[52] U.S. Cl. ............................................ 345/428; 345/430
[58] Field of Search .................................... 345/427, 428, 345/429, 430, 418, 419

[56] References Cited

U.S. PATENT DOCUMENTS

| | | | |
|---|---|---|---|
| 4,586,038 | 4/1986 | Sims et al. ............................. | 345/430 |
| 5,278,949 | 1/1994 | Thayer .................................... | 395/126 |
| 5,307,449 | 4/1994 | Kelley et al. .......................... | 395/119 |
| 5,343,558 | 8/1994 | Akeley .................................... | 395/126 |
| 5,463,723 | 10/1995 | Saha ....................................... | 395/134 |

OTHER PUBLICATIONS

OpenGL Reference Manual: The Official Reference Document for OpenGL, Release 1, OpenGL Architecture Review Board, Addison–Wesley Publishing Company (1992), pp. 7–23, 25–39, 41–53, 67, 69, 293–297.

Niimi, Haruo et al. *A Parallel Processor System for Three–Dimensional Color Graphics,* Computer Graphics, SIGGRAPH '84 Conference Proceedings, vol. 18, No. 3 (Jul. 1984), pp. 67–76.

Bloomenthal, Jules. *Edge Inference with Applications to Antialiasing,* Computer Graphics, SIGGRAPH '83 Conference Proceedings, vol. 17, No. 3 (Jul. 1983), pp. 157–162.

Akeley, Kurt. *RealityEngine Graphics,* Computer Graphics Proceedings, SIGGRAPH '93 Conference Proceedings, (Aug. 1993), pp. 109–126.

*Primary Examiner*—Phu K. Nguyen
*Assistant Examiner*—Cliff N. Vo
*Attorney, Agent, or Firm*—Blakely, Sokoloff, Taylor & Zafman LLP

[57] ABSTRACT

A method and apparatus for performing post-process antialiasing of polygon edges. According to one aspect of the invention, a method is provided for modifying the color of a pixel in a texture mapped representation of an image generated from a plurality of polygons. According to this method, it is determined that an edge of one of the plurality of polygons intersects a scan line in the texture mapped representation at an intersection point. In addition, the pixel within which this intersection point lies is determined. The color for this pixel is identified by pixel data stored as part of the texture mapped representation. A filter is performed using the texture mapped representation as an input texture map by: 1) determining a texture point in the input texture map that corresponds to the intersection point; 2) performing a filter on texels in the input texture map identified by that texture point to determine a corrected color for the pixel; and 3) altering the pixel data stored as part of the texture mapped representation for the pixel containing the intersection point to indicate the corrected color. According to another aspect of the invention, the filter used in this method is either a linear filter, a bilinear filter, a quadratic filter, or a cubic filter. According to another aspect of the invention, the step of performing the filter is performed using the same hardware used for performing the texture mapping of the texture mapped representation.

65 Claims, 7 Drawing Sheets

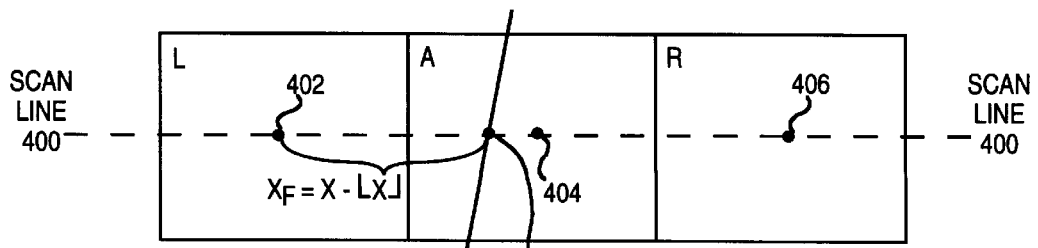
FIG. 4A  POLYGON EDGE 410   INTERSECTION POINT(X,Y) 412
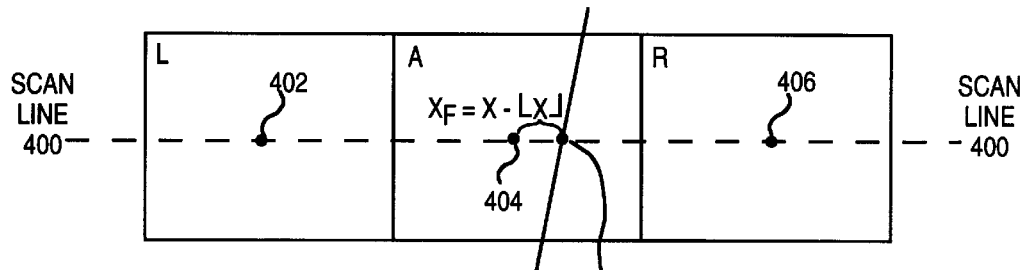
FIG. 4B  POLYGON EDGE 420   INTERSECTION POINT(X,Y) 422
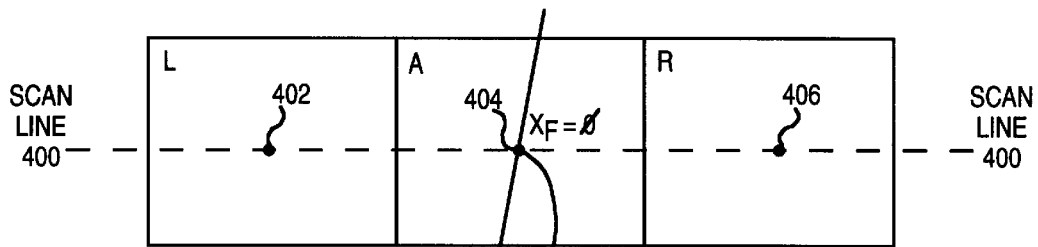
FIG. 4C  POLYGON EDGE 440   INTERSECTION POINT(X,Y) 442
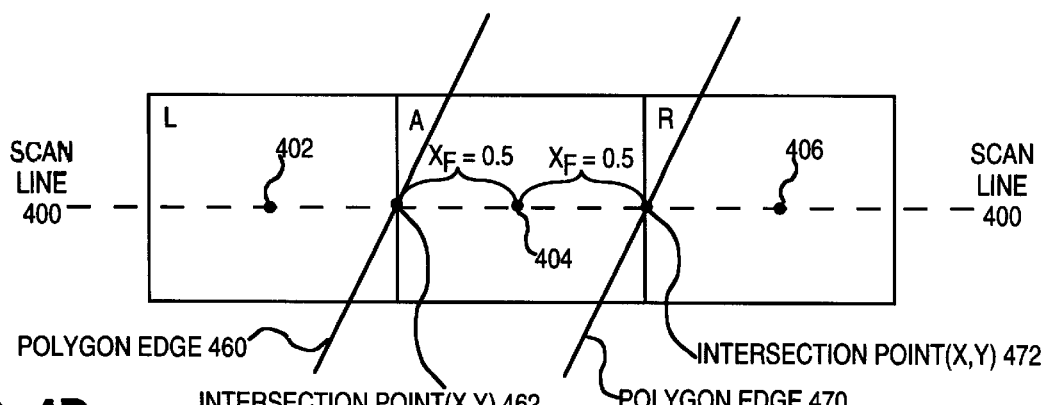
FIG. 4D  POLYGON EDGE 460   INTERSECTION POINT(X,Y) 462   POLYGON EDGE 470   INTERSECTION POINT(X,Y) 472

METHOD AND APPARATUS FOR PERFORMING POST-PROCESS ANTIALIASING OF POLYGON EDGES

PRIORITY

This application claims the benefit of U.S. Provisional Application No. 60/002,626, filed Aug. 22, 1995; U.S. Provisional Application No. 60/002,625, filed Agu. 22, 1995; and U.S. Provisional Application No. 60/002,620, filed Aug. 22, 1995.

BACKGROUND OF THE INVENTION

1. Field of the invention

The invention relates to the field of computer systems. More specifically, the invention relates to the antialiasing of video images.

2. Background information

In order to display three-dimensional objects, a computer system typically models the objects using polygons (e.g., triangles). When these polygons are drawn on a raster graphics display, the polygons are typically sampled at pixel centers. This technique causes non-vertical and non-horizontal polygon edges to appear jagged. When a polygon is moved slowly on a display, the "jags" on a jagged polygon edge appear to crawl as one views successive frames of the image (This visually annoying phenomenon is commonly known as the "crawling ants" or the "jaggies effect"). The jaggies effect is a well-known instance of a phenomenon known as aliasing. Operations that have the visual effect of removing the jaggies effect are referred to as "antialiasing" operations. For a further description of antialiasing, see Foley, James D., et al. *Computer Graphics Principles and Practice*, 2nd Edition, Addison-Wesley Publishing Co. (1990) pp. 132–144 (referred to herein as the "Foley" reference).

Improving the appearance of texture-mapped polygons requires antialiasing texture mapping, as well as antialiasing polygon edges. There are many well-known techniques for antialiasing texture mapping (see *OpenGL Reference Manual: The Official Reference Document for OpenGL. Release* 1, OpenGL Architecture Review Board, Addison-Wesley Publishing Co. (1992) pp. 295–296). One such technique employs bilinear filtering. When applying bilinear filtering, the output pixel is a function of four adjacent input pixels and can be considered a 2×2 convolution with weights as shown below:

$$f_1 f_2 \quad f_1(1-f_2)$$
$$(1-f_1)f_2 \quad (1-f_1)(1-f_2)$$

where $f_1$, and $f_2$ are in the range [0,1].

The techniques of antialiasing polygon edges fall into one of three categories: pre-processing, multi-sampling, and post-processing. The pre-processing techniques require the antialiasing operations to be performed before a scene is "rendered" (The term "rendered" is used herein to refer to the conversion of a set of polygons into a set of pixel data representative of an image to be displayed on a computer screen). Typically, the pre-processing techniques are computation intensive and require additional hardware (e.g., an "alpha" buffer). For a description of pre-processing techniques, see *OpenGL Reference Manual: The Official Reference Document for OpenGL, Release* 1, OpenGL Architecture Review Board, Addison-Wesley Publishing Co. (1992) pp. 295–296; and Niimi, Haruo et al. *A Parallel Processor System for Three-Dimensional Color Graphics*, Computer Graphics, Vol. 18, No. 3 (July 1984), pp. 67–76. The multi-sampling techniques require rendering the entire scene multiple times (or at a higher resolution) and accumulating the results. As a result, the multi-sampling techniques typically require expensive hardware to maintain a high frame rate when drawing each pixel many times (typically 8–16 times). In addition, the multi-sampling techniques are currently too slow for low-cost, real time three-dimensional graphics rendering. For a further description of multi-sampling techniques, see Akeley, Kurt. *Reality Engine Graphics*, Computer Graphics Proceedings, Association for Computing Machinery, Inc. (1993), pp. 109–126.

The post-processing technique is taught in Bloomenthal, Jules. *Edge Inference with Applications to Antialiasing*, Computer Graphics, Vol. 17, No. 3 (July 1983), pp. 157–162 (referred to herein as the "Bloomenthal" reference). The Bloomenthal reference describes the following steps: 1) rendering an entire non-texture mapped scene with aliased polygon edges; 2) inferring the polygon edges in the scene; and 3) antialiasing polygon edges in the non-texture mapped scene by modifying certain output pixels based on values of certain input pixels in the scene. The manner in which the output pixels are modified is determined using a digital box filter. The digital box filter requires computing the intersection of the pixel with the polygon, computing the area of this intersection, and computing the convolution weights from this area. Unfortunately, due to the computational effort required to infer the polygon edges and to determine the exact areas of intersection, this technique is currently too slow to be commercially viable.

SUMMARY

A method and apparatus for performing post-process antialiasing of polygon edges are provided. According to one aspect of the invention, a method is provided for modifying the color of a pixel in a texture mapped representation of an image generated from a plurality of polygons. According to this method, it is determined that an edge of one of the plurality of polygons intersects a scan line in the texture mapped representation at an intersection point. In addition, the pixel within which this intersection point lies is determined. The color for this pixel is identified by pixel data stored as part of the texture mapped representation. A filter is performed using the texture mapped representation as an input texture map by: 1) determining a texture point in the input texture map that corresponds to the intersection point; 2) performing a filter on texels in the input texture map identified by that texture point to determine a corrected color for the pixel; and 3) altering the pixel data stored as part of the texture mapped representation for the pixel containing the intersection point to indicate the corrected color. According to another aspect of the invention, the filter used in this method is a linear filter with two or more weights. According to another aspect of the invention, the step of performing the filter is performed using the same hardware used for performing the texture mapping of the texture mapped representation.

According to another aspect of the invention, an apparatus is described for generating output images for display on a computer screen. The apparatus generally includes an interface, a processor, a memory controller, and a filter unit. The processor is coupled to the interface to receive and process polygon data representative of an image. The filter unit is coupled to the memory controller and the processor. In one mode, the filter unit generates pixel data for a texture mapped output image in response to receiving the processed polygon data from the processor and receiving texture maps from a memory coupled to the memory controller. The resulting texture mapped output image is stored in the memory by the memory controller. In a second mode, the filter unit generates corrected pixel data for the texture mapped output image in response to receiving texel data produced by accessing the texture mapped output image as an input texture map. The texel data accessed includes the texel data for the texels that correspond to pixels in the texture mapped output image that require alteration to antialias polygon edges in the texture mapped output image.

BRIEF DESCRIPTION OF THE DRAWINGS

The invention may best be understood by referring to the following description and accompanying drawings which illustrate the invention. In the drawings:

FIG. 4a is a block diagram illustrating a first case of a polygon edge intersecting a horizontal scan line according to one embodiment of the invention.

FIG. 4b is a block diagram illustrating a second case of a polygon edge intersecting a horizontal scan line according to one embodiment of the invention.

FIG. 4c is a block diagram illustrating a third and fourth case of a polygon edge intersecting a horizontal scan line according to one embodiment of the invention.

FIG. 4d is a block diagram illustrating a fourth case of polygon edges intersecting a horizontal scan line according to one embodiment of the invention.

DETAILED DESCRIPTION

This document describes a method and apparatus for performing post-process antialiasing of polygon edges. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
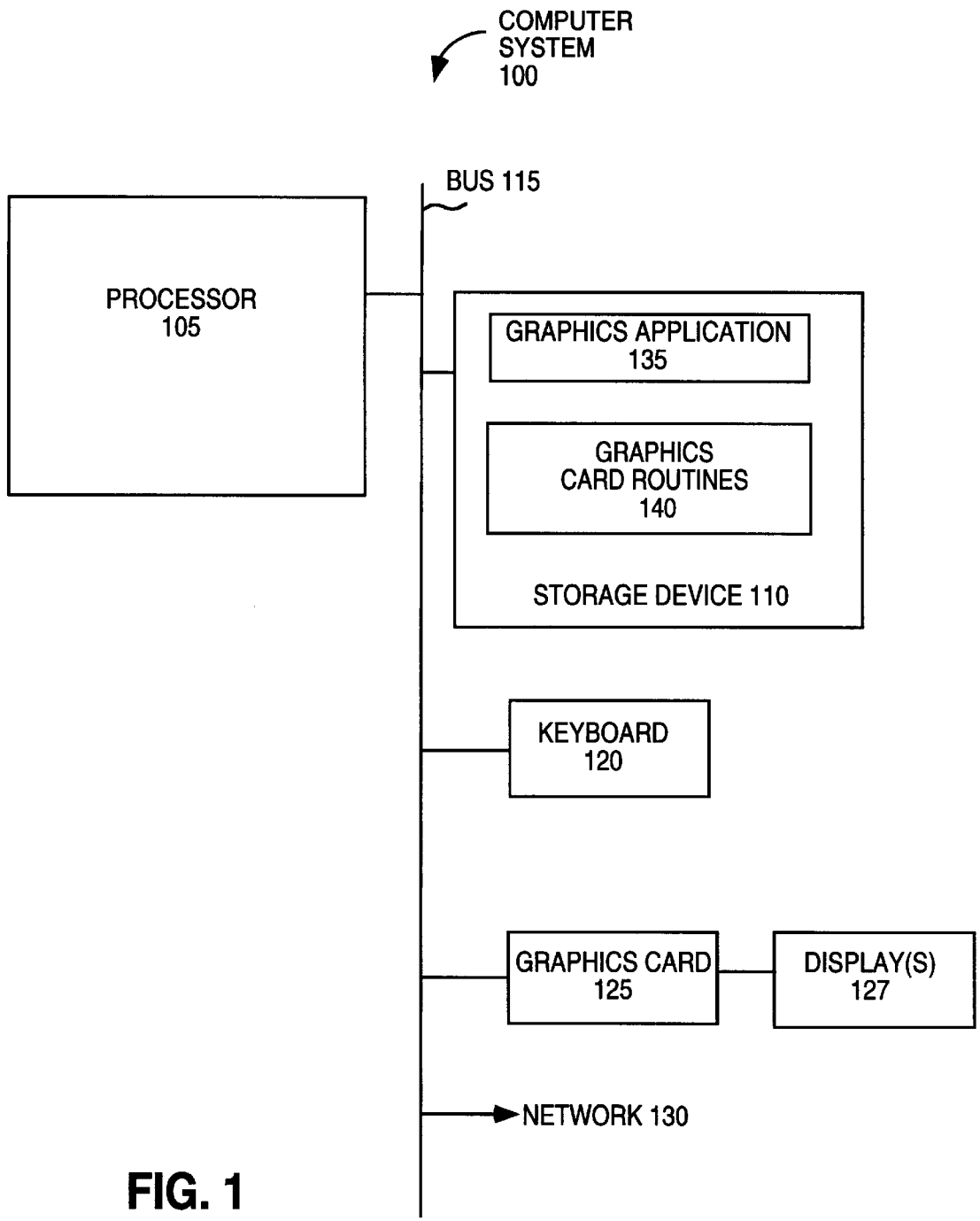
FIG. 1 shows a block diagram illustrating an exemplary computer system 100 according to one embodiment of the invention.

FIG. 1 shows a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices are typically coupled to the bus 115. For example, a keyboard 120 may be coupled to the bus 115. As another example, a graphics card 125 is coupled between the bus 115 and one or more displays 127. A network 130 may also be coupled to bus 115.

The processor 105 represents a central processing unit of any type of architecture, such as a CISC, RISC, VLIW, or hybrid architecture. While this embodiment is described in relation to a single processor computer system, the invention could be implemented in a multi-processor computer system. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also termed as bus controllers).

FIG. 1 also illustrates that the storage device 110 has stored therein a graphics application 135 for execution on the processor 105. In addition, the storage device additionally includes graphics card routines 140 for execution by a processor on the graphics card 125. Of course, the storage device 110 preferably contains additional software (not shown), which is not necessary to understanding the invention. In one embodiment, one or more routines in the graphics application 135 are executed on the processor 105 to generate data (e.g., geometry data, including polygon data and color data; texture map data; control/state data; etc.) concerning an image to be displayed on the one or more displays 127. This data is then transmitted to the graphics card 125. In response to receiving this data, the graphics card 125, executing one or more of the graphics card routines 140, renders a set of pixel data (referred to herein as the "output image") representative of the image and causes that output image to be displayed on one or more of the displays 127.

The graphics card may be implemented to perform any number of techniques to render the output image, such as depth cueing, depth clipping, visible line determination, visible surface determination, reflection mapping, illumination, texture mapping, etc. In one embodiment of the invention, the graphics card 125 performs post-process antialiasing of polygon edges in a rendered scene. In this embodiment, the graphics card 125 generates and draws to a memory a "texture mapped output image" (please note that in this document the term "output image" is used herein to refer to any rendered image, including a texture mapped output image). The graphics card 125 then antialiases polygon edges in that texture mapped output image by performing a filter on the texture mapped output image as if it were an input texture map and modifying certain pixels in the texture mapped output image based on the results of this filter. According to other aspects of the invention, only selected polygon edges are antialiased and the same hardware used to perform texture mapping is used to perform the polygon edge antialiasing filter.

The hardware and software used in one embodiment of the graphics card will now be described in more detail. Of course, alternative embodiments may use different combinations of hard-wired circuitry and/or software instructions to implement the invention. For example, the graphics card 125 may be implemented wholly in hardware. In addition, alternative embodiments may distribute the processing between the processor 105 and the graphics card 125 in a different manner. For example, software executing on the processor 105 could be implemented to generate and transmit the output image for display on one or more of the displays 127. Thus, the invention is not limited to any specific combination of hardware circuitry and software.

Figure 2:
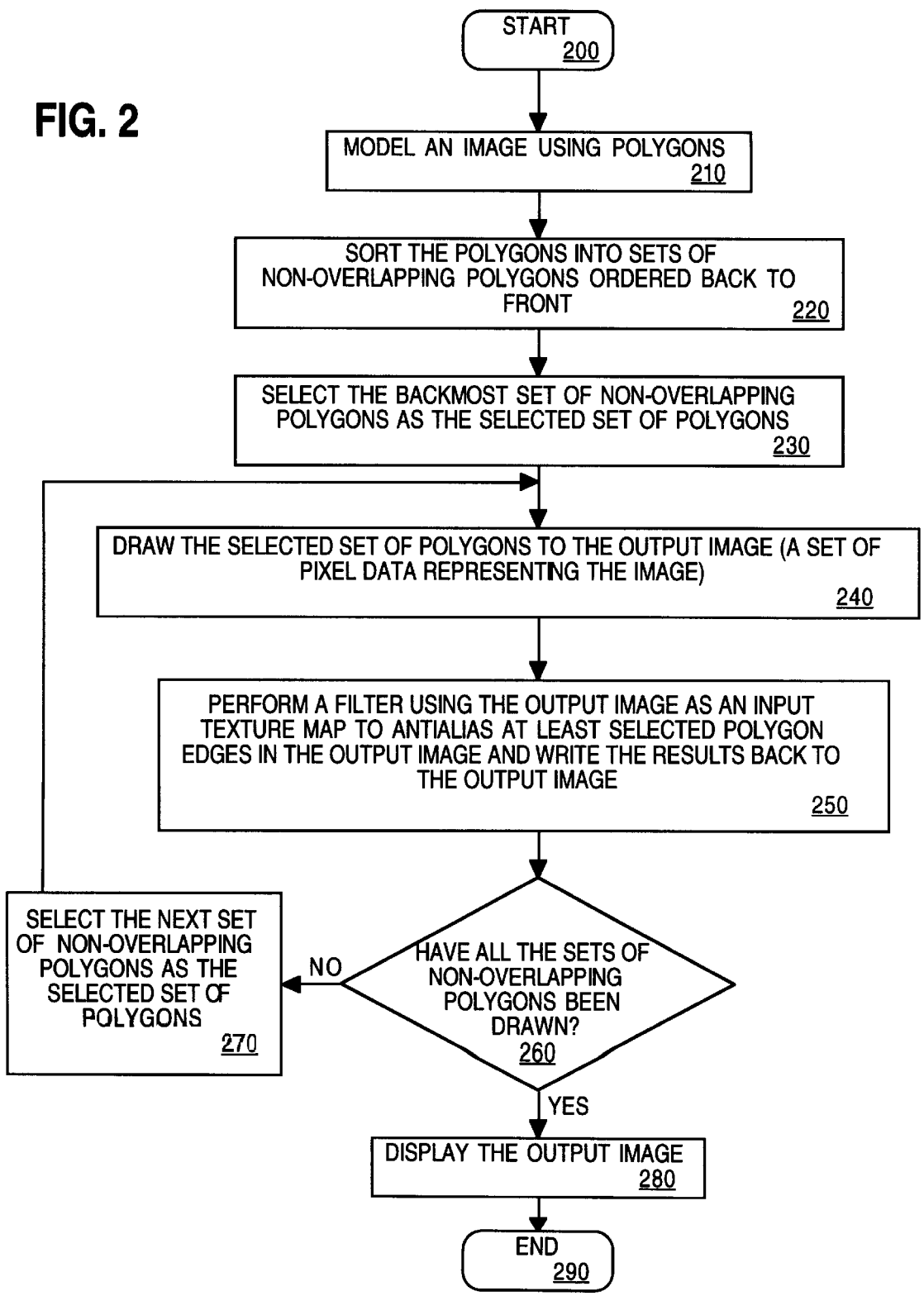
FIG. 2 is a flow diagram illustrating a method for performing post-process antialiasing of polygon edges according to one embodiment of the invention.

FIG. 2 is a flow diagram illustrating a method for performing post-process antialiasing of polygon edges according to one embodiment of the invention. The method shown in FIG. 2 does not use "Z-buffering" (a well-known, efficient technique for removing hidden parts in a graphic scene). Another embodiment of the invention that uses Z-buffering is later described herein. The flow diagram begins at step 200, from which flow passes to step 210.

At step 210, an image is modeled using polygons and flow passes to step 220. There are many well-known techniques for performing step 210. In one embodiment of the invention, step 210 is performed by the processor 105 in response to executing routine(s) from the graphics application 135.

As shown in step 220, the polygons are sorted into sets of non-overlapping polygons ordered back-to-front and flow passes to step 230. The order of the sets of non-overlapping polygons determined in this step dictates the order in which these sets of non-overlapping polygons are drawn. Since polygons drawn later overwrite polygons drawn earlier, this order ensures that closer polygons overwrite any polygons behind them. Techniques for performing this step are also well-known in the art. In one embodiment, this step is performed by the processor 105 in response to executing routine(s) from the graphics application 135.

At step 230, the back-most set of non-overlapping polygons is selected and flow passes to step 240. In one embodiment, this step is also performed using well-known techniques by the processor 105 in response to executing routine(s) from the graphics application 135.

As shown in step 240, the selected set of polygons is drawn to the output image and flow passes to step 250. The set of pixel data making up the output image includes data identifying the attributes of each pixel to be displayed. These attributes include all or some aspects of a pixel's color (e.g., the hue, saturation, and luminance).

In one embodiment, the output image is generated by the graphics card 125 in response to receiving data concerning the output image (e.g., geometric data; texture-map data; color data; etc.) from the processor 105. When generating the output image, the graphics card 125 can be implemented to perform any number of graphics operations (e.g., depth cueing, depth clipping, visible line determination, visible surface determination, reflection mapping, illumination, texture mapping, etc.). In fact, one embodiment of the invention performs texture mapping to generate a texture mapped output image. However, unlike graphics cards utilizing the pre-processing or multi-sampling techniques, one embodiment of the invention does not antialias polygon edges when rendering the output image.

As shown in step 250, a filter is performed using the output image as an input texture map to antialias at least selected polygon edges. In one embodiment described later herein, the filter of step 250 is a linear filter with two weights. However, alternative embodiments could implement the filter of step 250 using a linear filter with more than two weights. The pixel data resulting from performing the filter of step 250 is written back to the output image to alter attributes of the appropriate pixels in the output image. Such modification is performed by overwriting the appropriate pixel data in the output image with the corrected pixel data. While various embodiments may be implemented which only alter certain pixel attributes, one embodiment of the invention is implemented to alter any of the pixel attributes as required. Techniques for performing step 250 will be further described with reference to FIG. 3. From step 250, flow passes to step 260.

Many commercially available graphics cards write the output image to a frame buffer. From the perspective of many of these graphics card, the frame buffer is a write-only memory. Thus, these graphics cards cannot access the output image as an input texture map. In contrast, in one embodiment of the invention later described, the memory used to store the output image may be read and written by the graphics card. In this embodiment, the graphics card is capable of reading the output image as an input texture map to perform the filtering in step 250. In addition, this implementation allows the updated pixel data to be written over the existing pixel data in the output image. While one embodiment is described in which the output image is overwritten with the corrected pixel data, alternative embodiments could be implemented in which the antialiased output image is duplicated or written to another storage device or location. In one embodiment, the graphics card 125 switches from drawing (step 240) to filtering (step 250) in response to control or state data received from the processor 105.

At step 260, it is determined if all the sets of non-overlapping polygons have been drawn. If all the sets of non-overlapping polygons have not been drawn, flow passes to step 270. At step 270, the next set of non-overlapping polygons is selected and flow passes back to step 240. In one embodiment, these steps are performed by the processor 105 in response to executing routine(s) from the graphics application 135.

When all of the sets of non-overlapping polygons have been drawn, the output image is complete and flow passes to step 280. At step 280, the output image is displayed on one or more of the displays and flow passes to step 290 where the flow diagram ends.

Figure 3:
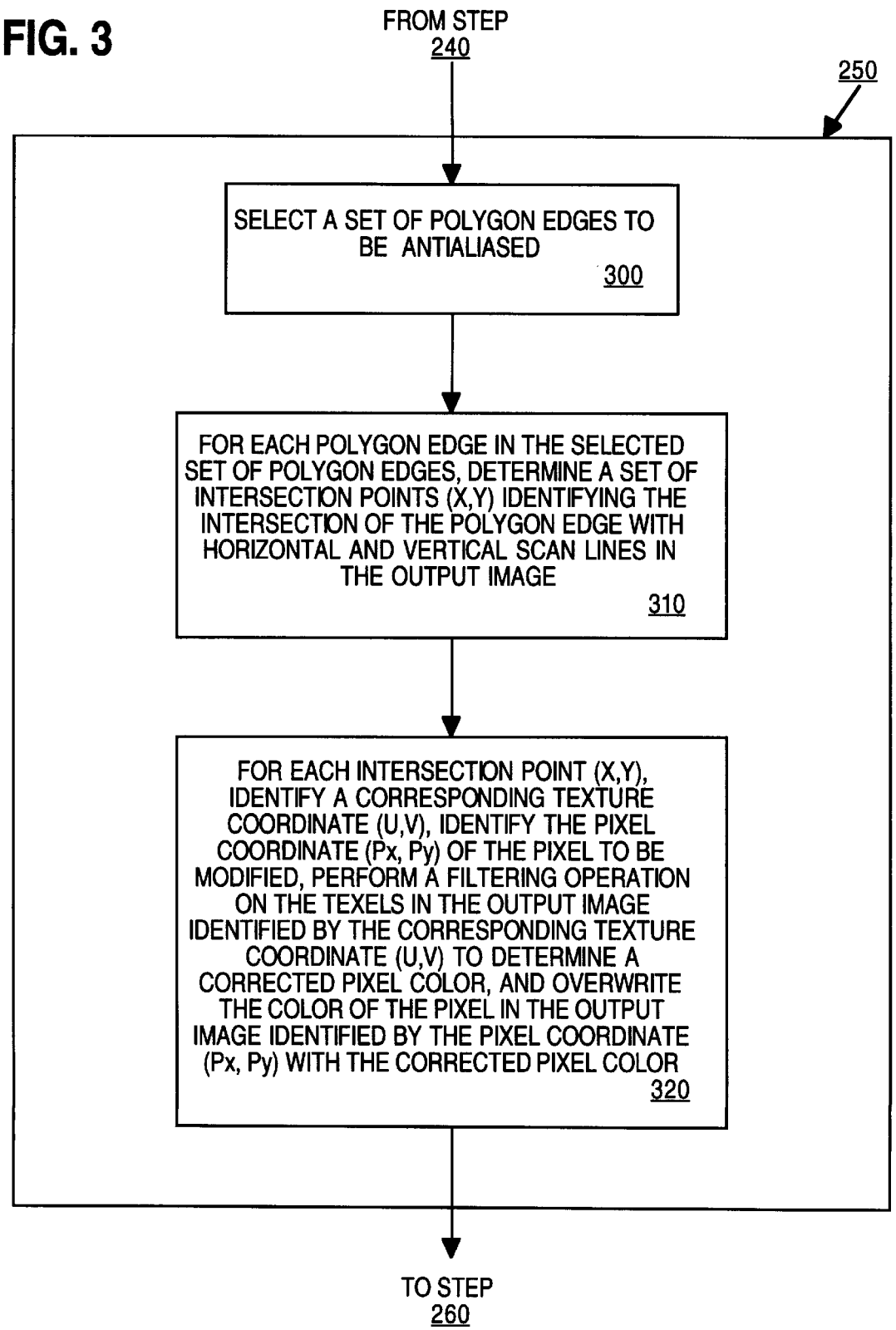
FIG. 3 is a flow diagram illustrating a method for performing step 250 from FIG. 2 according to one embodiment of the invention.

FIG. 3 is a flow diagram illustrating a method for performing step 250 from FIG. 2 according to one embodiment of the invention. According to this method, flow passes from step 240 to step 300.

As shown in step 300, a set of the polygon edges forming the selected set of non-overlapping polygons is chosen for antialiasing and flow passes to step 310. Since the improvement in image quality resulting from antialiasing a polygon edge varies depending on the type of polygon edge being antialiased, various embodiments select only certain types of polygon edges for antialiasing. For example, the antialiasing of silhouette edges (edges where one adjacent face is back-facing and the other is front-facing) and polygon edges where the adjacent polygons are of significantly different colors (e.g., material and/or lighting edges) provides a noticeable improvement in image quality. As a result, various embodiments of the invention select only silhouette edges, material edges and/or lighting edges for antialiasing. Since most of the polygon edges in an image are not silhouette, lighting, or material edges, this provides a significant performance increase. Techniques for selecting the silhouette edges, material edges, and lighting edges are well-known in the art. Of course, alternative embodiments could select additional polygon edges, different polygon edges, or all polygon edges.

In one embodiment of the invention, step 300 is performed by the processor 105 in response to executing routine(s) from the graphics application 135 of FIG. 1. In this embodiment, the selected edges to be antialiased can be identified using any number of techniques. For example, the processor 105, executing routine(s) of the graphics application 135, could provide data describing the set of polygons representing the image to the graphics card 125 (see step 210), and then later provide to the graphics card 125 data describinglidentifying the selected polygon edges to be antialiased (see step 300). As another example, the processor 105, executing the graphics application 135, could provide to the graphics card 125 both data describing the set of polygons representing the image and data describing/identifying which polygon edges are to be antialiased in step 210 (e.g., flags could be stored in the data identifying which polygon edges should be antialiased). During the step of drawing the various sets of polygons (step 240), the graphics card 125 would store the identified polygon edges for use when performing the digital filter (step 250). Thus, the invention is not limited by the technique used to identify the set of polygon edges to be antialiased.

As shown in step 310, a set of intersection points (x,y) is identified for each polygon edge in the set of polygon edges selected in step 300. Each set of intersection points identifies the intersection of the corresponding polygon edge with the horizontal and vertical scan lines in the output image. The notation (x,y) is used to refer to the coordinate space for an image to be displayed on a computer screen. Since texture maps reside in their own coordinate space, the notation (u,v) is used to refer to the texture coordinate space of a texture map. In one embodirnent, step 310 is performed by the graphics card 125 using well-known techniques. From step 310, flow passes to step 320.

At step 320, each of the intersection points (x,y) identified in step 310 is processed. The processing of an intersection point (x,y) includes: 1) identifying a corresponding texture coordinate (u,v) for the intersection point (x,y); 2) identifying the pixel coordinate (Px,Py) for the pixel to be modified; 3) performing a filtering operation (e.g., a linear filter with two weights) on the "texels" (the individual elements of a texture map) in the input texture map (i.e., the output image) identified by that corresponding texture coordinate to determine corrected pixel data; and 4) overwriting the pixel data in the output image identified by the pixel coordinate (Px,Py) with the corrected pixel data. Techniques for identifying the texture coordinates (u,v), for identifying the pixel coordinate (Px,Py), and for performing the filter are described with reference to FIGS. 4a–d. In one embodiment, step 320 is performed by the graphics card 125. From step 320, flow passes to step 260.

While the invention is described herein as a series of steps (see FIGS. 2–3 and 5–6), the invention is not limited to serially performing these steps. For example, many of these steps could be performed in parallel. In addition, many of these steps could be performed in a different order and/or in different combinations. For example, step 310 requires the determination of a set of intersection points (x,y) for each polygon edge, while step 320 describes the processing to be performed on each intersection point (x,y) identified in step 310. Of course, the invention could be implemented to iteratively process subsets of the polygon edges to be antialiased, rather than processing all of the polygon edges and then processing all of the intersection points (x,y). For example, the invention may be implemented to iteratively perform steps 310 and 320 on one polygon edge at a time.

The filter in step 250 from FIG. 2 is performed to determine corrected colors for pixels in order to antialias polygon edges. The color of a pixel is identified using at least three components (e.g., red, green, blue). The filter is performed for each component to determine the corrected color for the pixel being modified. As an example, a linear filter with two weights can be performed using the following quations:

$$R_0' = R_0 W_0 + R_1 W_1$$

$$G_0' = G_0 W_0 + G_1 W_1$$

$$B_0' = B_0 W_0 + B_1 W_1$$

where $R_0$, $G_0$, and $B_0$ respectively represent the red, green, and blue components of the color for pixel $P_0$; $R_1$, $G_1$, and $B_1$ respectively represent the red, green, and blue components of the color for pixel $P_1$; $W_0$ and $W_1$ respectively represent the weights for pixels $P_0$ and $P_1$; and $R_0'$, $G_0'$, and $B_0'$ respectfully represent the corrected red, green, and blue components of the color for pixel $P_0$. To ease understanding of the invention, rather than writing out the equations for each component of a color (see above equations for $R_0'$, $G_0'$, and $B_0'$), the equations are represented herein using a single equation containing the labels for the pixels (e.g., $P_0' = P_0 W_0 + P_1 W_1$). While one embodiment is described in which a linear filter with two weights is implemented, alternative embodiments could be implemented that use a linear filter with more than two weights ($P_0' = P_0 W_0 + P_1 W_1 + P_i W_i$).

FIGS. 4a–d illustrate the four possible cases of a polygon edge intersecting a horizontal scan line according to one embodiment of the invention. With reference to FIGS. 4a–d, techniques for identifying the texture coordinates (u,v), for identifying the pixel coordinate (Px,Py), and for performing the filter are described. The four possible cases of a polygon edge intersecting a vertical scan line will be later described.

FIG. 4a is a block diagram illustrating a first case of a polygon edge intersecting a horizontal scan line according to one embodiment of the invention. FIG. 4a shows a pixel A, an adjacent pixel L to the left of the pixel A, and an adjacent pixel R to the right of the pixel A. A horizontal scan line 400 is shown passing through the integral points 402, 404, and 406 of the pixels L, A, and R, respectively. In addition, FIG. 4a shows a polygon edge 410 intersecting the scan line 400 between the integral points 402 and 404 at an intersection point (x,y) 412 within the pixel A. The polygon edge 410 can be at any angle. This case differs from the other cases in that the intersection point (x,y) is to the left of the integral point 404 in the pixel A.

Since the intersection point (x,y) 412 is on the horizontal scan line 400, the value of y is integral. In contrast, x falls between the integral points 402 and 404. Thus, x has an integral part ($x_i$) and a fractional part ($x_f$). FIG. 4a also illustrates that the value of $X_f$ is the distance between the intersection point (x,y) 412 and the integral point 402. The value of $x_f$ can be calculated using the floor function (represented by the notation "$\lfloor \ \rfloor$") The floor function removes the fractional part of a floating point number (e.g., $\lfloor 1.7 \rfloor = 1$). Thus, the value of $X_f$ can be calculated by the equation $x - \lfloor x \rfloor$. In addition, the integral point 402 is at coordinate point ($x_i, y_i$), where $x_i = \lfloor x \rfloor$ and $y_i = y$.

Since the intersection point (x,y) 412 falls within the pixel A, the color of pixel A should be modified to correct for aliasing. Thus, the integral point 404 is the pixel coordinate (Px,Py) of the pixel to be modified. Accordingly, the following equation may be used to determine the corrected pixel color for the pixel A:

$$A' = A(1.5 - x_f) + L(x_f - 0.5)$$

where A and L respectively identify the colors of the pixels A and L, A' identifies the corrected pixel color for pixel A, and $x_f$ is in the range of (0.5,1).

FIG. 4b is a block diagram illustrating a second case of a polygon edge intersecting a horizontal scan line according to one embodiment of the invention. FIG. 4b also shows the scan line 400 passing through the integral point 402 of the pixel L, the integral point 404 of the pixel A, and the integral point 406 of the pixel R. However, in contrast to FIG. 4a, the FIG. 4b shows a polygon edge 420 intersecting the scan line 400 at an intersection point (x,y) 422 between the integral point 404 and the integral point 406. Thus, unlike the intersection point (x,y) 412 from FIG. 4a, the intersection point (x,y) 422 lies to the right of the integral point 404 of the pixel A. The polygon edge 420 can be at any angle. FIG. 4b also shows that the value of $X_f$ is the distance between the intersection point (x,y) 422 and the integral point 404 ($x_f=x-\lfloor x \rfloor$). In addition, the integral point 402 is at coordinate point ($x_i,y_i$), where $X_i=\lfloor x \rfloor$ and $y_i=y$.

Since the intersection point (x,y) 422 lies within the pixel A, the color of pixel A should be modified to antialias the polygon edge 420. Thus, the integral point 404 is the pixel coordinate (Px,Py) of the pixel to be modified. Accordingly, the color of pixel A may be modified using the following equation:

$$A'=A(0.5+x_f)+R(0.5-x_f)$$

where R is the color of the pixel R and $x_f$ is in the range of (0, 0.5).

FIG. 4c is a block diagram illustrating a third case of a polygon edge intersecting a horizontal scan line according to one embodiment of the invention. Like FIGS. 4a–b, FIG. 4c shows the horizontal scan line 400 passing through the integral point 402 of the pixel L, the integral point 404 of pixel A, and the integral point 406 of the pixel R. FIG. 4c also shows a polygon edge 440 intersecting the scan line 400 at an intersection point (x,y) 442. The polygon edge 440 can be at any angle. Unlike the previous intersection points, both the intersection point (x,y) 442 and the integral point 404 are at the coordinate point ($x_i,y_i$). As a result, both x and y have only an integral value (i.e., $x_f$ and $y_f$ are equal to zero).

Since the intersection point (x,y) 422 lies within the pixel A, the color of pixel A should be modified to alias the polygon edge 440. Whether the pixel A is determined to be inside or outside of the polygon depends on the application of half-open rule for polygon rasterization. One variant of this rule (referred to as "rasterization rule [)") operates as follows: 1) if the polygon having the polygon edge 440 extends from the intersection point (x,y) 442 toward pixel L, then pixel A is considered to be inside the polygon and the corrected color for pixel A is calculated using the equation A'=(A*0.5)+(L*0.5); and 2) if the polygon having the polygon edge 440 extends from the intersection point (x,y) 442 toward pixel R, then pixel A is considered to be outside the polygon. In contrast, another variant of this rule (referred to as "rasterization rule (]") operates as follows: 1) if the polygon having the polygon edge 440 extends from the intersection point (x,y) 442 toward pixel L, then pixel A is considered to be outside the polygon; and 2) if the polygon having the polygon edge 440 extends from the intersection point (x,y) 442 toward pixel R, then pixel A is considered to be inside the polygon and the corrected color for pixel A is calculated using the equation A'=(A*0.5)+(R*0.5).

FIG. 4d is a block diagram illustrating a fourth case of polygon edges intersecting a horizontal scan line according to one embodiment of the invention. Like FIGS. 4a–4c, FIG. 4d shows the horizontal scan line 400 passing through the integral point 402 of pixel L, the integral point 404 of pixel A, and the integral point 406 of pixel R. FIG. 4d also shows a polygon edge 460 intersecting the scan line 400 at an intersection point (x,y) 462 located at the midpoint between the integral point 402 and the integral point 404. In addition, FIG. 4d shows a polygon edge 470 intersecting the scan line 400 at an intersection point (x,y) 472 located at the midpoint between the integral point 404 and the integral point 406. The polygon edges 460 and 470 can be at any angle. For the polygon edge 460, the following is true: 1) the value of $X_f$ is the distance between the intersection point (x,y) 462 and the integral point 402 ($x_f=x-\lfloor x \rfloor$); and 2) the integral point 402 is at coordinate point ($x_i, y_i$), where $x_i=\lfloor x \rfloor$ and $y_i=y$. For the polygon edge 470, the following is true: 1) the value of $x_f$ is the distance between the intersection point (x,y) 472 and the integral point 404 ($x_f=x-\lfloor x \rfloor$); and 2) the integral point 404 is at coordinate point ($x_i, y_i$), where $x_i=\lfloor x \rfloor$ and $y_i=y$.

When a polygon edge intersects the scan line at the midpoint between two integral points, the pixel considered to contain the intersection point is a matter of convention. However, in this case, the color of pixel A does not need to be altered. Therefore, A'=A.

Table 1 illustrates the equations used in one embodiment of the invention to determine the values for (u,v) and (Px,Py) when using rasterization rule [). The notation x, y, u, and v without a subscript are used to indicate both the integral and fractional portions of those values.

TABLE 1

| | Case 1 | Case 2 | Case 3 | Case 4 |
|---|---|---|---|---|
| $x_i =$ | $\lfloor x \rfloor$ | $\lfloor x \rfloor$ | $\lfloor x \rfloor$ | $\lfloor x \rfloor$ |
| $x_f =$ | $x - \lfloor x \rfloor$ $x_f$ is in the range (0.5,1) | $x - \lfloor x \rfloor$ $x_f$ is in the range (0,0.5) | $x - \lfloor x \rfloor = 0$ | $x - \lfloor x \rfloor = 0.5$ |
| $y_i =$ | y | y | y | y |
| $y_f =$ | 0 | 0 | 0 | 0 |
| $u_i =$ | $\lfloor x \rfloor$ | $\lfloor x \rfloor$ | $\lfloor x \rfloor - 1$ | $\lfloor x \rfloor$ |
| $u_f =$ | $1.5 - x_f$ $u_f$ is in the range (0.5,1) | $0.5 - x_f$ $u_f$ is in the range (0,0.5) | 0.5 | 0 |
| $v_i =$ | y | y | y | y |
| $v_f =$ | 0 | 0 | 0 | 0 |
| $P_x =$ | $x_i + 1$ | $x_i$ | $x_i$ | $x_i$ |
| $P_y =$ | y | y | y | y |

Table 2 illustrates the equations used in one embodiment of the invention to determine the values for (u,v) and (Px,Py) when using rasterization rule (].

TABLE 2

| | Case 1 | Case 2 | Case 3 | Case 4 |
|---|---|---|---|---|
| $x_i =$ | $\lfloor x \rfloor$ | $\lfloor x \rfloor$ | $\lfloor x \rfloor$ | $\lfloor x \rfloor$ |
| $x_f =$ | $x - \lfloor x \rfloor$ $x_f$ is in the range (0,0.5) | $x - \lfloor x \rfloor$ $x_f$ is in the range (0.5,1) | $x - \lfloor x \rfloor = 0$ | $x - \lfloor x \rfloor = 0.5$ |
| $y_i =$ | y | y | y | y |
| $y_f =$ | 0 | 0 | 0 | 0 |
| $u_i =$ | $\lfloor x \rfloor$ | $\lfloor x \rfloor$ | $\lfloor x \rfloor$ | $\lfloor x \rfloor + 1$ |
| $u_f =$ | $0.5 - x_f$ $u_f$ is in the range (0.5,1) | $1.5 - x_f$ $u_f$ is in the range (0,0.5) | 0.5 | 0 |
| $v_i =$ | y | y | y | y |
| $v_f =$ | 0 | 0 | 0 | 0 |
| $P_x =$ | $x_i + 1$ | $x_i$ | $x_i$ | $x_{i+1}$ |
| $P_y =$ | y | y | y | y |

One embodiment of the invention is implemented to identify each of the above cases and calculate (u,v) and (Px,Py) accordingly. In contrast, alternative embodiments of the invention are implemented to handle all of the above cases using the same set of equations by approximating the values for Px, $u_i$, and $u_f$. The set of equations used in embodiments which approximate Px, $u_i$, and $u_f$ are shown in Table 3, where "ε" symbolizes the smallest representable number such that x-ε is not equal to x. Depending on the representation used for floating point numbers, the values of $\epsilon_1, \epsilon_2, \epsilon_3,$ and $\epsilon_4$ may be the same or different. As a result of using the same set of equations to handle all cases of a polygon edge intersecting a horizontal scan line, performance is improved

TABLE 3

|  | Rasterization Rule [) | Rasterization Rule (] |
|---|---|---|
| $x'$ = | $x + 0.5$ | $x + 0.5$ |
| $x'_f$ = | $x' - \lfloor x' \rfloor$ | $x' - \lfloor x' \rfloor$ |
| $y_i$ = | $y$ | $y$ |
| $y_f$ = | 0 | 0 |
| $u_i$ = | $\lfloor x - \epsilon_1 \rfloor$ | $\lfloor x \rfloor$ |
| $u_f$ = | $1 - \epsilon_2 - x'_f$ | $1 - \epsilon_4 - x'_f$ |
| $v_i$ = | $y$ | $y$ |
| $v_f$ = | 0 | 0 |
| $P_x$ = | $\lfloor x' - \epsilon_3 \rfloor$ | $\lfloor x' \rfloor$ |
| $P_y$ = | $y$ | $y$ |

In other embodiments, the equations shown in Table 3 are realized in hardware using floating point arithmetic. As an example, one hardware implementation that represents floating point numbers using a 16.16 fixed point approximation (1 bit sign, 15 bit integer, 16 bit fraction) will be described. Of course, alternative implementations are possible and the invention is not limited to 16.16 representations. In this example, the notation "0x" is used to indicate a hexadecimal number, the notation ">>" is used to indicate a right shift by 16 operation, the notation "AND" is used to indicate a logical AND operation, and the notation "~" is used to indicate a logical complement operation. In an implementation representing floating point numbers using 16.16, the same value for $\epsilon$ (1/65536=0x1) can be used for all cases, a right shift by 16 operation is equivalent to a floor operation, and 0.5=32768/65536=0x8000. The set of equations used for rasterization rule [) and rasterization rule (] are shown in Table 4.

TABLE 4

|  | Rasterization Rule [) | Rasterization Rule (] |
|---|---|---|
| $x_i$ = | $\lfloor x \rfloor$ | $\lfloor x \rfloor$ |
| $x_f$ = | $x - \lfloor x \rfloor$ | $x - \lfloor x \rfloor$ |
| $x'$ = | $x + 0.5 - \epsilon = x + 0x8000 - 0x1$ | $x + 0.5 = x + 0x8000$ |
| $y_i$ = | $y$ | $y$ |
| $y_f$ = | 0 | 0 |
| $u_i$ = | $(x - 0x1) >> 16$ | $x >> 16$ |
| $u_f$ = | $(\sim x')$ AND 0xFFFF | $(\sim x')$ AND 0xFFFF |
| $v_i$ = | $y$ | $y$ |
| $v_f$ = | 0 | 0 |
| $P_x$ = | $x' >> 16$ | $x' >> 16$ |
| $P_y$ = | $y$ | $y$ |

For the intersection of a polygon edge with vertical scan lines, x will be integral and y will be non-integral. Thus, determining the texture coordinate (u,v) corresponding to these intersection points would be the same, with the exception that the v and y values would be modified, as opposed to the x and u values. The possible cases of a polygon edge intersecting with a vertical scan line are illustrated by rotating the FIGS. 4a–c 90°, such that the pixel L is above the pixel A. Thus, the values of y and v are modified in the same manner as the values of x and u.

Figure 5:
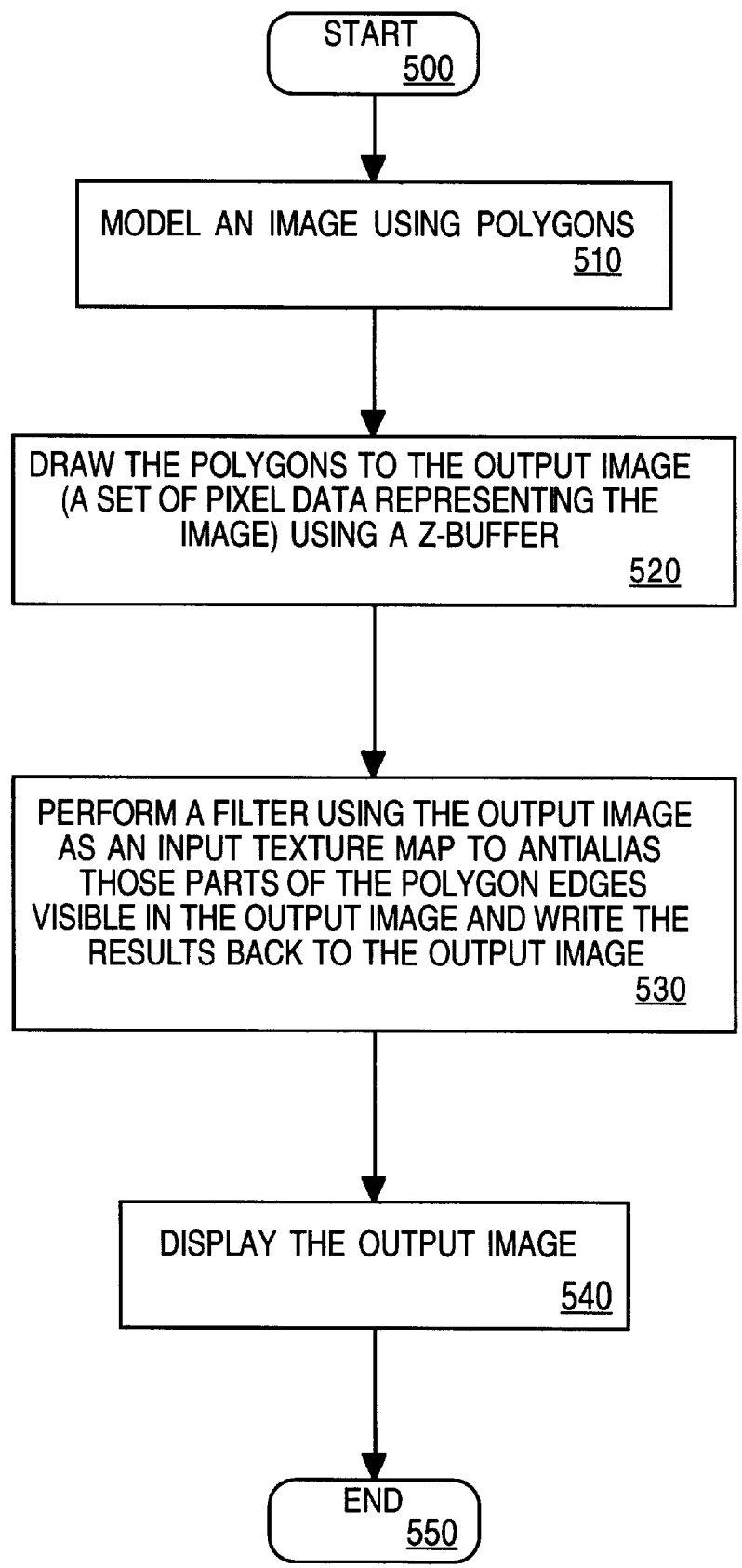
FIG. 5 is a flow diagram illustrating a method for performing post-process antialiasing of polygon edges according to another embodiment of the invention.

FIG. 5 is a flow diagram illustrating a method for performing post-process antialiasing of polygon edges according to another embodiment of the invention. The method shown in FIG. 5 utilizes the well-known technique of Z-buffering. As will be described, the use of Z-buffering avoids both the need to sort and draw the polygons in back-to-front order and avoids performing the filtering operations on polygon edges that are not visible. The flow diagram starts at step 500, from which flow passes to step 510.

At step 510, an image is modeled using polygons and flow passes to step 520. The step 510 may be performed in a similar manner to the step 210.

As shown in step 520, the polygons are drawn to the output image using Z-buffering and flow passes to step 530. Unlike the method described with reference to FIG. 2 that required the polygons be sorted into sets of non-overlapping polygons that must be drawn in back-to-front order, the use of Z-buffering allows all of the polygons to be written to the output image. Aside from the fact that all of the polygons are written to output image, the step 520 is similar to the step 240 from FIG. 2.

At step 530, a filter (e.g., a linear filter with two weights) is performed using the output image as an input texture map to antialias only those parts of the polygon edges visible in the output image. The pixel data resulting from performing this filter is written back to the output image to alter attributes of the appropriate pixels in the output image. Thus, this step is similar to step 250 from FIG. 2. However, unlike step 250, only those parts of the polygon edges that are visible in the output image are antialiased. By reducing the number of intersection points, performance is increased. Techniques for performing step 530 will be further described with reference to FIG. 6. From step 530, flow passes to step 540.

At step 540, the output image is displayed and flow passes to step 550 where the flow diagram ends. The step 540 is performed in the same manner as the step 280 from FIG. 2.

Figure 6:
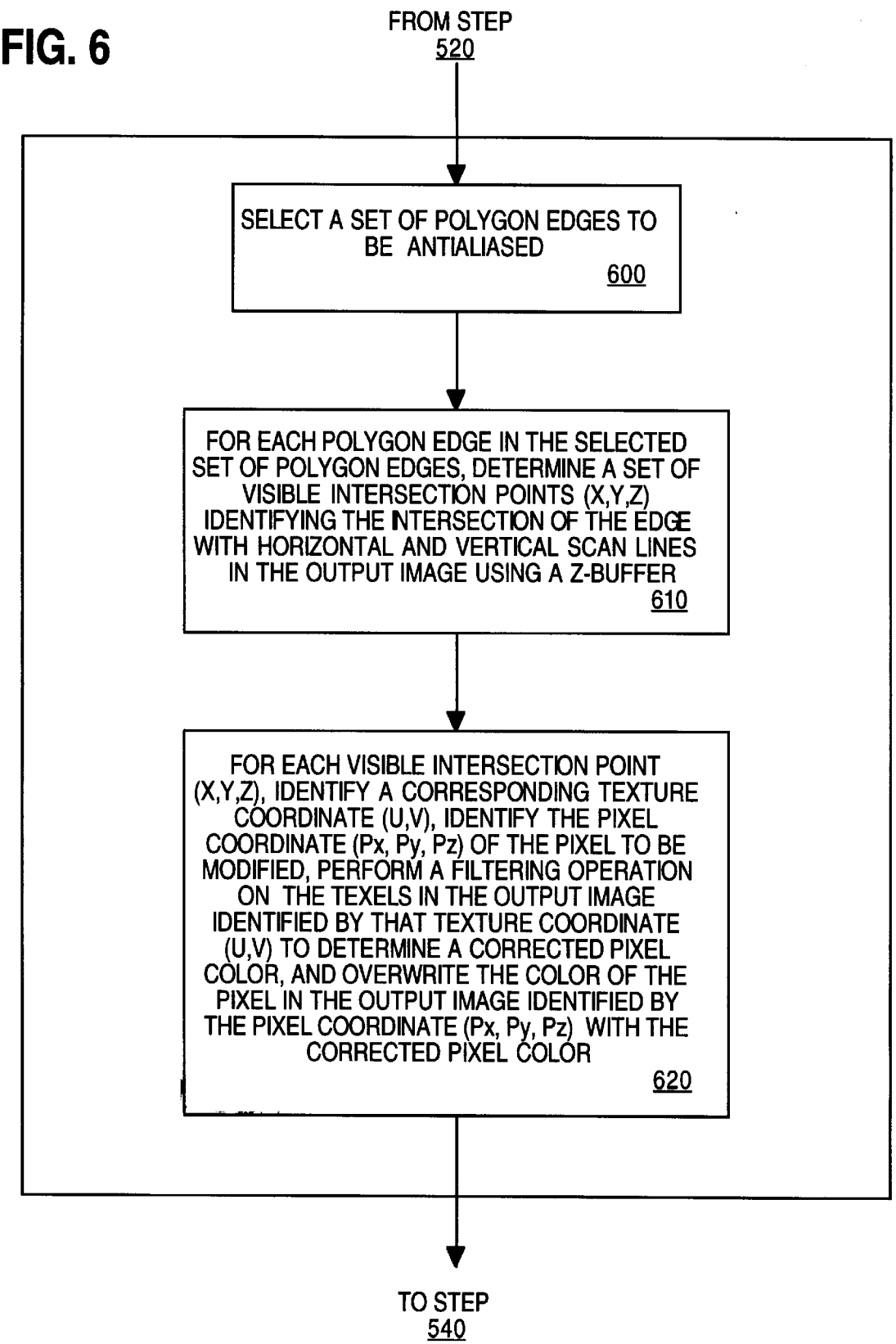
FIG. 6 is a flow diagram illustrating a method for performing the step 530 from FIG. 5 according to one embodiment of the invention.

FIG. 6 is a flow diagram illustrating a method for performing the step 530 from FIG. 5 according to one embodiment of the invention. FIG. 6 shows flow passing from step 520 to step 600.

As shown in step 600, a set of the polygon edges forming polygons in the output image is selected for antialiasing and flow passes to step 610. Step 600 is performed in the same manner as step 300 from FIG. 3.

As shown in step 610, a set of visible intersection points (x,y, z) is identified for each polygon edge in the set of polygon edges selected in step 600. Unlike the set of intersection points (x,y) determined in step 310 of FIG. 3, the set of visible intersection points determined in step 610 only includes intersection points that belong to parts of polygon edges that are visible in the output image. To select these intersection points, Z-buffering is used to compare the z value of each intersection point with an appropriate value stored in the Z-buffer. If an intersection point's z value is equal to the current value in the Z-buffer, then the intersection point is selected. Otherwise, that intersection point is not processed. In this manner, the number of intersection points requiring processing is reduced and performance is improved. From step 610, flow passes to step 620.

At step 620, each visible intersection point (x,y,z) is processed. The step 620 is performed in the same manner as the step 320. Thus, each visible intersection point is processed by: 1) determining a corresponding texture coordinate (u,v); 2) identifying the pixel coordinate (Px,Py,Pz) for the pixel to be modified; 3) performing a filtering operation (e.g., a linear filter with two weights) on the texels in the input texture map identified by that texture coordinate to determine corrected pixel data, and 4) overwriting the pixel data in the output image identified by the pixel coordinate (Px,Py,Pz) with the corrected pixel data. From step 620, flow passes to step 540.

Figure 7:
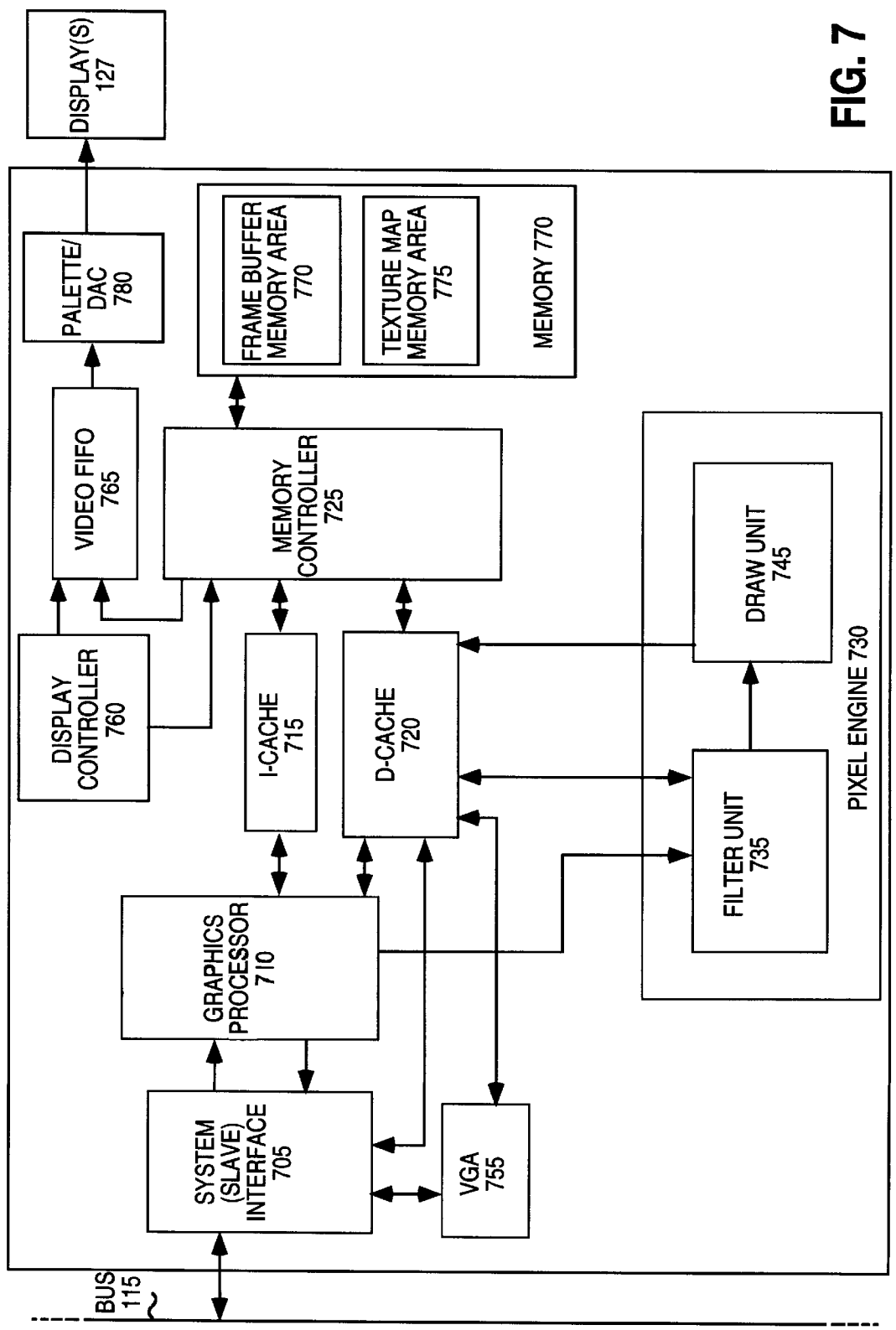
FIG. 7 is a block diagram illustrating the graphics card of FIG. 1 according to one embodiment of the invention.

FIG. 7 is a block diagram illustrating the graphics card of FIG. 1 according to one embodiment of the invention. In this embodiment of the invention, the hardware used to perform antialiasing of the texture maps (e.g., a bilinear filter unit performing the 2×2 convolution described in the background) is used to perform the antialiasing of the polygon edges. While the embodiment shown in FIG. 7 includes a graphics processor which executes instructions to render the set of pixel data representative of the image and causes the image to be displayed, alternative embodiments may use different combinations of hard-wired circuitry and/or software instructions to implement the invention. For example, the graphics card may be implemented wholly in hardware.

FIG. 7 illustrates a system (slave) interface 705 for communication with the bus 115 of FIG. 1. The system (slave) interface 705 is coupled to a graphics processor 710 and a video graphics adapter (VGA) 755. In one embodiment, the graphics processor 710 is a reduced instruction set processor that operates using an instruction cache (I-cache) 715 and a data cache (D-cache) 720. The VGA 755 is also coupled to the system (slave) interface 705 and the data cache 720. The function of the VGA 755 is well known. The instruction cache 715 and the data cache 720 are coupled to a memory controller 725 that is coupled to a memory 750. The memory 750 represents any form of machine readable medium for storing data and instructions. The memory 750 includes a frame buffer memory area 770 and a texture map memory area 775. While in one embodiment, the memory 750 is shown being located on the graphics card, alternative embodiments could be implemented to also or only access data and instructions from storage device 110.

In one embodiment, the graphics card routines 140 are loaded from the storage device 110 into the memory 750 through the system interface 705, graphics processor 710, data cache 720, and memory controller 725 during system initialization. Alternative embodiments are implemented to load the graphics card routines 140 into the memory 750 in another manner and/or to have some or all of the routines permanently stored on the graphics card. During operation subsequent to system initialization, the instruction cache 715 retrieves processor instructions from the memory 750 using the memory controller 725.

The processor 105, executing the graphics application 135, generates and transmits to the graphics processor 710 over the bus 115 the necessary data (e.g., geometry data; state data; texture map data; etc.) to generate a texture-mapped output image. Any or all parts of this data may be transmitted using any number of techniques. In one embodiment, the texture maps needed to create images are loaded into the texture map memory area 775 through the system (slave) interface 705, graphics processor 710, data cache 720 and memory controller 725. Alternatively, just the address(es) of the texture maps could be written to the graphics card and the graphics card could be responsible for accessing those texture maps.

In response to receiving the state data from the processor 105 indicating the texture-mapped output image should be drawn, the graphics processor 710 (executing graphics card routines accessed from the memory 750) processes the geometry and texture map data and transmits the necessary pixel information to a pixel engine 730 to draw the texture mapped output image. In one embodiment, this pixel information includes the pixel coordinates (Px,Py,Pz), the pixel color (RGB), the alpha (A), the fog (F), the texture coordinates (u,v), and the perspective factor (Q). The pixel engine 730 includes a filter unit 735 and a draw unit 745. The filter unit 735 is coupled to the D-cache 720 to allow for access to the texture mapped images stored in the texture map memory area 775. Based on the texture coordinates received, the filter unit 735 modifies texels in the texture maps to perform antialiasing of those texture maps and transmits the results to the draw unit 745. The draw unit 745 uses the pixel coordinates and color data to draw the texture mapped output image through the D-cache 720 to the memory 750. In one embodiment, the frame buffer memory area 770 can be both read and written. In the embodiment in which the frame buffer memory area 770 can be both read and written, the texture mapped output image is written to the frame buffer memory area 770. Alternative embodiments may store the texture mapped output image in any number of different storage areas. In addition, the storage area used to store the texture mapped output image may be located any number of places, including in the graphics card, in the monitor, etc. When drawing polygons, the draw unit 745 may be implemented to perform any number of functions, such as blending, hazing, and fogging.

The graphics card illustrated in FIG. 7 can be implemented to perform either the non-Z-buffering method or the Z-buffering method previously described. If Z-buffering is implemented, then the entire scene is rendered. However, if Z-buffering is not implemented, then different sets of non-overlapping polygons are iteratively rendered as previously described. In either case, at the required time the graphics processor 710 switches from drawing the texture mapped output image to antialiasing polygon edges in the texture mapped output image. As previously described with reference to one embodiment of the invention, this conversion is performed responsive to the processor 105 transmitting to the graphics processor 710 the polygon edges to be antialiased, as well as state data indicating the graphics card should now perform polygon edge antialiasing. As a result of receiving this input, the graphics processor 710 determines the intersection points for those polygon edges, determines the texture coordinate points corresponding to those intersection points, determines the pixel coordinates of the pixels to be modified based on those intersection points, and passes the determined texture coordinate points and pixel coordinates to the filter unit 735. In addition, the graphics processor 710 transmits the necessary control signals to the filter unit 735 to indicate antialiasing of polygon edges is to be performed.

In response to receiving the pixel coordinates, texture coordinate points and control signals, the filter unit 735 accesses the texture mapped output image stored in the frame buffer memory area 770 as an input texture map. The filter unit 735 access the texture mapped output image through the D-cache 720 and the memory controller 725. In the embodiment in which the texture mapped output image was written to the frame buffer memory area 770 and the frame buffer memory area 770 can be both read and written, the filter unit 735 reads the required parts of the texture mapped output image from the frame buffer memory area 770. The filter unit 735 then performs the required filtering operation and passes the results to the draw unit 745. The draw unit 745 draws the corrected pixel data back to the texture mapped output image in the frame buffer memory area 770 through the D-cache 720 and the memory controller 725. In this manner, the same hardware used to perform antialiasing of the texture maps (the filter unit 735) is used for performing the antialiasing of the polygon edges.

A display controller 760 is coupled to the memory controller 725 and a video first-in-first-out (FIFO) 765 for writing the output image into the video FIFO 765. A palette/DAC unit 780 is coupled to the video FIFO 765 to access the output image and transmit the output image to one or more of the display(s) 127 for display.

While one embodiment has been described in which the same hardware is used for performing the antialiasing of texture maps and the antialiasing of polygon edges, alternative embodiments could implement this filtering in a different combination of hardware and/or software. For example, the antialiasing of the texture mapping could be performed using the filter unit 735, while the antialiasing of the polygon images could be performed in software executing on the graphics processor 710. As another example, an additional hardware unit could be included for performing the necessary filtering to antialias the polygon edges. As another example, a traditional write only frame buffer could be included in addition to a read/write memory area for storing the texture mapped output image. In an embodiment with the additional read/write memory area, the texture mapped output image would be read from this additional memory area when performing the antialiasing of the polygon edges.

While one embodiment has been described in which the rendering of the output image and the antialiasing of polygon edges in that output image is performed in the graphics card 125, alternative embodiments could perform one or both of these operations using the processor 105. For example, in an alternative embodiment the graphics application 135 executing on the processor 105 could generate a texture mapped output image with aliased polygon edges and store it to a memory accessible by the graphics card 125. The graphics card 125 could be implemented to access this texture mapped output image, antialias the polygon edges, and cause the resulting output image to be displayed on one or more of the displays 127. As another example, the graphics application 135 executing on the processor 105 could perform both the generation of the texture mapped output image and the antialiasing of the polygon edges in that texture mapped output image. In this embodiment, the processor 105 would then transmit the resulting output image to one or more of the displays 127 for display.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method for modifying the color of a pixel in a texture mapped representation of an image generated from a plurality of polygons, said method comprising:

determining an edge of one of said plurality of polygons intersects a scan line in said texture mapped representation at an intersection point within said pixel, said texture mapped representation including pixel data identifying the color for said pixel; and performing a filter using the texture mapped representation as an input texture map by:

determining a texture point in said input texture map that corresponds to said intersection point;

performing a filter on texels in said input texture map identified by said texture point to determine a corrected color for said pixel; and altering pixel data in said texture mapped representation identifying the color of said pixel to indicate said corrected color.

2. The method of claim 1, wherein said filter is a linear filter with two or more weights.

3. The method of claim 1, wherein at least one of a set of attributes of said corrected color differs from the original color of said pixel, said set of attributes including hue, saturation, or luminance.

4. The method of claim 1, wherein said performing said filter is performed using the same hardware used for performing the texture mapping of said texture mapped representation.

5. The method of claim 1, further comprising the determining said intersection point lies on a part of said edge that is visible in said texture mapped representation.

6. A computer-implemented method for displaying an image on a screen, said method comprising:

generating a plurality of polygons representing said image, each of said plurality of polygons having a plurality of edges;

sorting the plurality of polygons into sets of non-overlapping polygons ordered from back to front to identify the order in which said sets of non-overlapping polygons are to be draw to an output image;

for each set of non-overlapping polygons in said sets of non-overlapping polygons:

drawing the set of non-overlapping polygons to the output image in the form of pixel data; and performing a filter using the output image as an input texture map to antialias at least selected polygon edges in the output image, said filter having as inputs at least selected texels in said input texture map corresponding to pixels along said selected polygon edges in said output image; and displaying said image on said screen using said antialiased output image.

7. The method of claim 6, wherein said drawing the set of non-overlapping polygons includes mapping said set of non-overlapping polygons.

8. The method of claim 7, wherein said performing said filter is performed using the same hardware used to perform said texture mapping.

9. The method of claim 6, wherein said filter is a linear filter with two or more weights.

10. The method of claim 6, wherein said performing said filter further comprises selecting any combination of material polygon edges, silhouette polygon edges, and lighting polygon edges in the output image as said selected polygon edges.

11. The method of claim 6, wherein said performing said filter further comprises:

selecting at least certain of said plurality of polygon edges visible in said output image as a selected set of polygon edges; and for each polygon edge in said selected set of polygon edges:

determining a set of intersection points identifying where said polygon edge intersects horizontal and vertical scan lines in said output image, each intersection point in said set of intersection points being within a pixel of said output image; and for at least each intersection point in said set of intersection points located on a visible part of said polygon edge,:

determining a texture point in said input texture map that corresponds to said intersection point;

performing a filter on texels in said input texture map identified by said texture point to determine corrected pixel data for the pixel in said output image containing said intersection point; and altering the pixel data for the pixel in said output image containing said intersection point to said corrected pixel data.

12. The method of claim 11, wherein said selecting at least certain of said plurality of polygon edges visible in said output image includes selecting any combination of material polygon edges, silhouette polygon edges, and lighting polygon edges as said selected set of polygon edges.

13. The method of claim 11, wherein each of the corrected pixel data identifies at least one of a set of attributes, said set of attributes including hue, saturation, and luminance.

14. A computer-implemented method for displaying an image on a screen, said method comprising:

drawing a representation of said image in the form of pixel data using a plurality of polygons, each of said plurality of polygons having a plurality of polygon edges;

performing a filter using the representation as an input texture map to antialias at least parts of selected polygon edges visible in the representation, said filter having as inputs at least selected texels in said input texture map corresponding to pixels along said selected polygon edges in said representation; and displaying said image on said screen using said antialiased representation.

15. The method of claim 14, wherein said drawing said representation is performed using Z-buffering.

16. The method of claim 14, wherein said drawing said representation includes texture mapping said plurality of polygons.

17. The method of claim 16, wherein said performing said filter is performed using the same hardware used to perform said texture mapping.

18. The method of claim 14, wherein said filter is a linear filter with two or more weights.

19. The method of claim 14, wherein said performing said filter further comprises selecting any combination of material polygon edges, silhouette polygon edges, and lighting polygon edges in said representation as said selected polygon edges.

20. The method of claim 14, wherein said performing said filter further comprises:

selecting at least certain of said plurality of polygon edges visible in said representation as a selected set of polygon edges; and for each polygon edge in said selected set of polygon edges:

determining a set of intersection points identifying where said polygon edge intersects horizontal and vertical scan lines in said representation, each intersection point in said set of intersection points being within a pixel of said representation; and for each intersection point in said set of intersection points located on a visible part of said polygon edge:

determining a texture point in said input texture map that corresponds to said intersection point;

performing a filter on texels in said input texture map identified by said texture point to determine corrected pixel data for the pixel in said representation containing said intersection point; and altering the pixel data for the pixel in said representation containing said intersection point to said corrected pixel data.

21. The method of claim 20, wherein said selecting at least certain of said plurality of polygon edges visible in said representation includes selecting any combination of material polygon edges, silhouette polygon edges, and lighting polygon edges as said selected set of polygon edges.

22. The method of claim 20, wherein each of the corrected pixel data identifies at least one of a set of attributes, said set of attributes including hue, saturation, and luminance.

23. The method of claim 20, wherein those intersection points in said set of intersection points located on said visible parts of said polygon edges are determined using Z-buffering.

24. A method for antialiasing a texture mapped output image generated using a plurality of polygons, each of said plurality of polygons having a plurality of polygon edges, said method comprising:

selecting at least certain of said plurality of polygon edges visible in said texture mapped output image as a selected set of polygon edges;

for each polygon edge in said selected set of polygon edges:

determining a set of intersection points identifying where said polygon edge intersects horizontal and vertical scan lines in said texture mapped output image, each intersection point in said set of intersection points being within a pixel of said texture mapped output image;

for at least each intersection point in said set of intersection points located on a visible part of said polygon edge:

determining a texture point in said texture mapped output image that corresponds to said intersection point;

performing a filter on texels in said texture mapped output image identified by said texture point to determine corrected pixel data for the pixel in said texture mapped output image containing said intersection point;

altering the pixel data for the pixel in said texture mapped output image containing said intersection point to said corrected pixel data.

25. The method of claim 24, wherein the texture mapped output image contains only non-overlapping polygons.

26. The method of claim 24, wherein said selecting at least certain of said plurality of polygon edges visible in said texture mapped output image includes selecting any combination of material polygon edges, silhouette polygon edges, and lighting polygon edges as said selected set of polygon edges.

27. The method of claim 24, wherein said performing said filter is performed using the same hardware used for performing the texture mapping of said texture mapped output image.

28. The method of claim 24, wherein said filter is a linear filter with two or more weights.

29. The method of claim 24, wherein each of the corrected pixel data identifies at least one of a set of attributes, said set of attributes including hue, saturation, and luminance.

30. The method of claim 24, wherein said determining said set of intersection points further includes:

determining which intersection points are located on visible parts of said polygon edge; and selecting only those only those intersection points located on visible parts of said polygon edge as said set of intersection points.

31. An apparatus for generating output images for display on a computer screen, said apparatus comprising:

an interface;

a processor coupled to said interface to receive and process polygon data representative of an image;

a memory controller configured to access texture maps and texture mapped output images from a memory; and a filter unit coupled to said memory controller and said processor, said filter unit selectively configurable to generate pixel data for a texture mapped output image representative of said image in response to receiving said texture maps and said processed polygon data, said filter unit also being selectively configurable to receive said texture mapped output image as an input texture map, said filter unit generating corrected pixel data for said texture mapped output image in response to receiving data representative of texels in said input texture map corresponding to pixels in said texture mapped output image that require alteration to perform antialiasing of polygon edges in said texture mapped output image.

32. The apparatus of claim 31, wherein said filter unit performs a linear filter when processing said texture mapped output image as an input texture map.

33. The apparatus of claim 31, wherein said filter unit is software for execution on said processor.

34. The apparatus of claim 31, wherein said processor generates intersection points of polygon edges in said texture mapped output image with scan lines in said texture mapped output image and generates at least one corresponding texture coordinate point in said input texture map for each intersection point, the texels in said input texture map received by said filter unit being selected using said corresponding texture coordinate points.

35. The apparatus of claim 31, further comprising:

a draw unit coupled to said filter unit and said memory controller to receive said corrected pixel data and to overwrite the pixel data of corresponding pixels in said texture mapped output image with said corrected pixel data.

36. A machine-readable medium having stored thereon one or more sequences of instructions whose execution by a set of one or more processors comprises the following:

determining an edge of one of a plurality of polygons intersects a scan line in a texture mapped representation of an image generated from said plurality of polygons at an intersection point within a pixel in said texture mapped representation, said texture mapped representation including pixel data identifying the color for said pixel; and performing a filter using the texture mapped representation as an input texture map by:
  determining a texture point in said input texture map that corresponds to said intersection point;
  performing a filter on texels in said input texture map identified by said texture point to determine a corrected color for said pixel; and
  altering pixel data in said texture mapped representation identifying the color of said pixel to indicate said corrected color.

37. The machine-readable medium of claim 36, wherein said filter is a linear filter with two or more weights.

38. The machine-readable medium of claim 36, wherein at least one of a set of attributes of said corrected color differs from the original color of said pixel, said set of attributes including hue, saturation, or luminance.

39. The machine-readable medium of claim 36, wherein said performing said filter is performed using the same hardware used for performing the texture mapping of said texture mapped representation.

40. The machine-readable medium of claim 36, wherein the execution by the set of one or more processors further comprises the following:

determining said intersection point lies on a part of said edge that is visible in said texture mapped representation.

41. A machine-readable medium having stored thereon one or more sequences of instructions whose execution by a set of one or more processors comprises the following:

generating a plurality of polygons representing an image, each of said plurality of polygons having a plurality of edges;

sorting the plurality of polygons into sets of non-overlapping polygons ordered from back to front to identify the order in which said sets of non-overlapping polygons are to be draw to an output image;

for each set of non-overlapping polygons in said sets of non-overlapping polygons:
  drawing the set of non-overlapping polygons to the output image in the form of pixel data; and
  performing a filter using the output image as an input texture map to antialias at least selected polygon edges in the output image, said filter having as inputs at least selected texels in said input texture map corresponding to pixels along said selected polygon edges in said output image; and displaying said image on a screen using said antialiased output image.

42. The machine-readable medium of claim 41, wherein said drawing the set of non-overlapping polygons includes mapping said set of non-overlapping polygons.

43. The machine-readable medium of claim 41, wherein said performing said filter is performed using the same hardware used to perform said texture mapping.

44. The machine-readable medium of claim 41, wherein said filter is a linear filter with two or more weights.

45. The machine-readable medium of claim 41, wherein said performing said filter further comprises selecting any combination of material polygon edges, silhouette polygon edges, and lighting polygon edges in the output image as said selected polygon edges.

46. The machine-readable medium of claim 41, wherein said performing said filter further comprises:

selecting at least certain of said plurality of polygon edges visible in said output image as a selected set of polygon edges; and for each polygon edge in said selected set of polygon edges:
  determining a set of intersection points identifying where said polygon edge intersects horizontal and vertical scan lines in said output image, each intersection point in said set of intersection points being within a pixel of said output image; and
  for at least each intersection point in said set of intersection points located on a visible part of said polygon edge:
    determining a texture point in said input texture map that corresponds to said intersection point;
    performing a filter on texels in said input texture map identified by said texture point to determine corrected pixel data for the pixel in said output image containing said intersection point; and
    altering the pixel data for the pixel in said output image containing said intersection point to said corrected pixel data.

47. The machine-readable medium of claim 46, wherein said selecting at least certain of said plurality of polygon edges visible in said output image includes selecting any combination of material polygon edges, silhouette polygon edges, and lighting polygon edges as said selected set of polygon edges.

48. The machine-readable medium of claim 46, wherein each of the corrected pixel data identifies at least one of a set of attributes, said set of attributes including hue, saturation, and luminance.

49. A machine-readable medium having stored thereon one or more sequences of instructions whose execution by a set of one or more processors comprises the following:

drawing a representation of an image in the form of pixel data using a plurality of polygons, each of said plurality of polygons having a plurality of polygon edges;

performing a filter using the representation as an input texture map to antialias at least parts of selected polygon edges visible in the representation, said filter having as inputs at least selected texels in said input texture map corresponding to pixels along said selected polygon edges in said representation; and displaying said image on a screen using said antialiased representation.

50. The machine-readable medium of claim 49, wherein said drawing said representation is performed using Z-buffering.

51. The machine-readable medium of claim 49, wherein said drawing said representation includes texture mapping said plurality of polygons.

52. The machine-readable medium of claim 51, wherein said performing said filter is performed using the same hardware used to perform said texture mapping.

53. The machine-readable medium of claim 49, wherein said filter is a linear filter with two or more weights.

54. The machine-readable medium of claim 49, wherein said performing said filter further comprises selecting any combination of material polygon edges, silhouette polygon edges, and lighting polygon edges in said representation as said selected polygon edges.

55. The machine-readable medium of claim 49, wherein said performing said filter further comprises:

selecting at least certain of said plurality of polygon edges visible in said representation as a selected set of polygon edges; and for each polygon edge in said selected set of polygon edges:

determining a set of intersection points identifying where said polygon edge intersects horizontal and vertical scan lines in said representation, each intersection point in said set of intersection points being within a pixel of said representation; and for each intersection point in said set of intersection points located on a visible part of said polygon edge:

determining a texture point in said input texture map that corresponds to said intersection point;

performing a filter on texels in said input texture map identified by said texture point to determine corrected pixel data for the pixel in said representation containing said intersection point; and altering the pixel data for the pixel in said representation containing said intersection point to said corrected pixel data.

56. The machine-readable medium of claim 55, wherein said selecting at least certain of said plurality of polygon edges visible in said representation includes selecting any combination of material polygon edges, silhouette polygon edges, and lighting polygon edges as said selected set of polygon edges.

57. The machine-readable medium of claim 55, wherein each of the corrected pixel data identifies at least one of a set of attributes, said set of attributes including hue, saturation, and luminance.

58. The method of claim 55, wherein those intersection points in said set of intersection points located on said visible parts of said polygon edges are determined using Z-buffering.

59. A machine-readable medium having stored thereon one or more sequences of instructions for antialiasing a texture mapped output image generated using a plurality of polygons, each of said plurality of polygons having a plurality of polygon edges, whose execution by a set of one or more processors comprises the following:

selecting at least certain of said plurality of polygon edges visible in said texture mapped output image as a selected set of polygon edges;

for each polygon edge in said selected set of polygon edges:

determining a set of intersection points identifying where said polygon edge intersects horizontal and vertical scan lines in said texture mapped output image, each intersection point in said set of intersection points being within a pixel of said texture mapped output image;

for at least each intersection point in said set of intersection points located on a visible part of said polygon edge, determining a texture point in said texture mapped output image that corresponds to said intersection point;

performing a filter on texels in said texture mapped output image identified by said texture point to determine corrected pixel data for the pixel in said texture mapped output image containing said intersection point;

altering the pixel data for the pixel in said texture mapped output image containing said intersection point to said corrected pixel data.

60. The machine-readable medium of claim 59, wherein the texture mapped output image contains only non-overlapping polygons.

61. The machine-readable medium of claim 59, wherein said selecting at least certain of said plurality of polygon edges visible in said texture mapped output image includes selecting any combination of material polygon edges, silhouette polygon edges, and lighting polygon edges as said selected set of polygon edges.

62. The machine-readable medium of claim 59, wherein said performing said filter is performed using the same hardware used for performing the texture mapping of said texture mapped output image.

63. The machine-readable medium of claim 59, wherein said filter is a linear filter with two or more weights.

64. The machine-readable medium of claim 59, wherein each of the corrected pixel data identifies at least one of a set of attributes, said set of attributes including hue, saturation, and luminance.

65. The machine-readable medium of claim 59, wherein said determining said set of intersection points further includes:

determining which intersection points are located on visible parts of said polygon edge; and selecting only those only those intersection points located on visible parts of said polygon edge as said set of intersection points.

* * * * *

UNITED STATES PATENT AND TRADEMARK OFFICE
CERTIFICATE OF CORRECTION

PATENT NO. : 6,005,580
DATED : December 21, 1999
INVENTOR(S) : Walter E. Donovan It is certified that error appears in the above-identified patent and that said Letters Patent is hereby corrected as shown below:

In column 5 at line 61 insert --.-- after the second occurrence of "data"

In column 6 at lines 34-35 delete "perforning" and insert --performing--

In column 7 at line 24 delete "embodirnent" and insert --embodiment--

In column 7 at line 66 delete "quations" and insert --equations--

In column 16 at line 63 delete "edge,:" and insert --edge:--

Signed and Sealed this

Twentieth Day of March, 2001

Attest:

NICHOLAS P. GODICI

*Attesting Officer*   *Acting Director of the United States Patent and Trademark Office*